United States Patent [19]

Wolfgang

[11] Patent Number: 4,811,596
[45] Date of Patent: Mar. 14, 1989

[54] ARRANGEMENT FOR TANK CONTENT MEASUREMENT OF AN OPERATING-MEDIUM TANK OF A VEHICLE

[75] Inventor: Eikelberg Wolfgang, Wolfsburg, Fed. Rep. of Germany

[73] Assignee: Volkswagen AG, Wolfsburg, Fed. Rep. of Germany

[21] Appl. No.: 121,602

[22] Filed: Nov. 17, 1987

[30] Foreign Application Priority Data

Nov. 18, 1986 [DE] Fed. Rep. of Germany ....... 3639446

[51] Int. Cl.$^4$ ............................................. G01F 17/00
[52] U.S. Cl. .................................................... 73/149
[58] Field of Search ..................... 73/149, 113, 290 B, 73/296, 149; 177/50, 136, 211

[56] References Cited

U.S. PATENT DOCUMENTS

| | | | |
|---|---|---|---|
| 1,730,173 | 10/1929 | Stearns | 73/296 |
| 1,818,001 | 8/1931 | Moorhouse | 73/296 |
| 3,082,621 | 3/1963 | Soderholm | 73/296 |
| 4,158,396 | 6/1979 | Suzuki et al. | 177/211 |
| 4,262,763 | 4/1981 | Raskin | 177/211 |

Primary Examiner—Stewart J. Levy
Assistant Examiner—Robert R. Raevis
Attorney, Agent, or Firm—Brumbaugh, Graves, Donohue & Raymond

[57] ABSTRACT

In order to obtain a sufficiently precise indication of the content of a tank, in particular of a fuel tank, fixed on a vehicle, the tank is supported at one end so as to be swingable around a horizontal spindle, and in the region of its other end acts on a torque-receiving member with a force-measuring element whose output signal is evaluated for determination of the prevailing weight of the filled tank as a measure for the tank content.

4 Claims, 1 Drawing Sheet

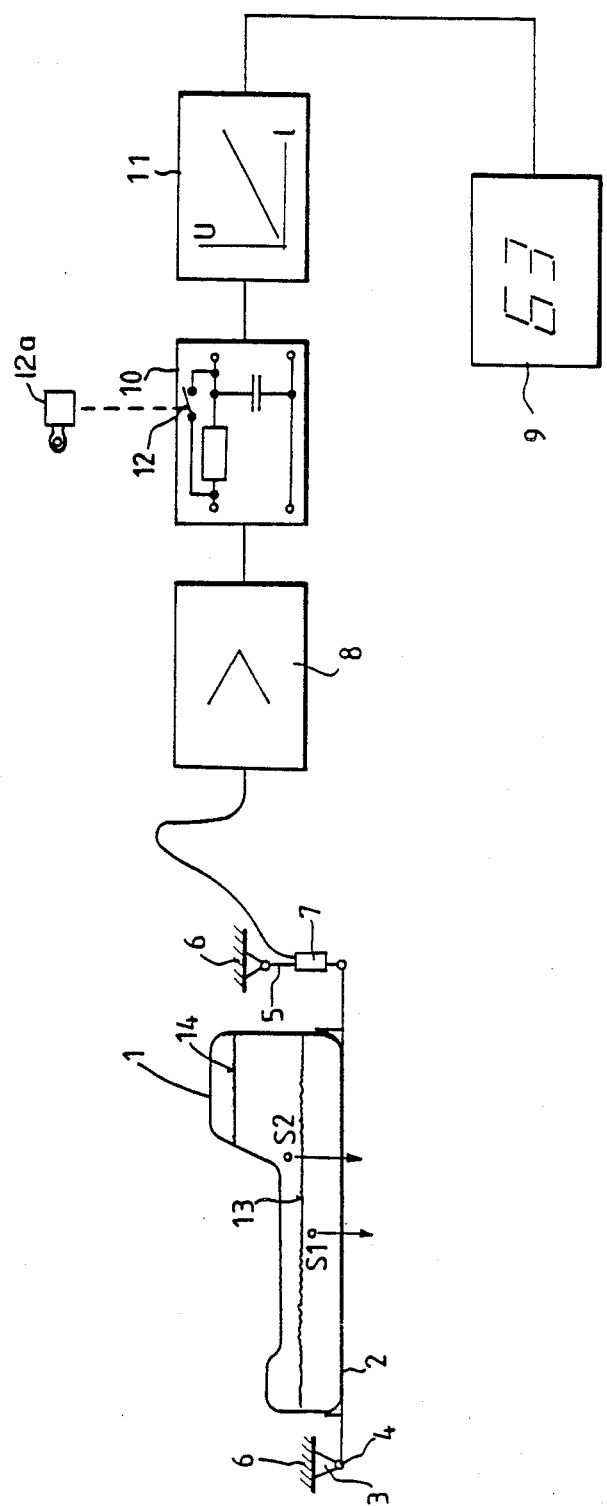

ARRANGEMENT FOR TANK CONTENT MEASUREMENT OF AN OPERATING-MEDIUM TANK OF A VEHICLE

BACKGROUND OF THE INVENTION

The invention concerns an arrangement for measurement of tank content in an operating-medium tank, in particular a fuel tank.

In determining the residual fuel content in a fuel tank, conventional arrangements determine the level measurement by means of a float. However, the precision of measurement of such arrangements is a function of the tank shape and becomes smaller as the tank is flatter. In the case of modern plastic tanks which offer the advantage of manufacture by blowing of very complicated tank shapes optimally utilizing the special space conditions in the vehicle, a sufficiently precise tank content measurement with conventional devices becomes almost impossible. To this must be added disadvantages such as: the utilization of sliding contacts; measures taken on and in the tank (e.g., openings for pickups or sensors); faulty measurements due to "breathing" of the tank when the temperature and the filling change; as well as, commonly, additional electromechanical instruments. It is thus apparent that there is a need for an arrangement which by simple means and independent of the shape of the tank permits a sufficiently precise determination of the tank content.

SUMMARY OF THE INVENTION

It is an object of the present invention to satisfy the above-mentioned need. Pursuant to this object, and others which will become apparent hereafter, one aspect of the present invention resides in a fuel tank swingable around an essentially horizontal spindle which extends at all filling conditions on the same side of the tank center of gravity, and a measuring device connected to the tank for determining the torque exerted by the tank around the spindle as a measure of tank content.

Due to the fact that the invention does not directly utilize the filling level, i.e., the height of the liquid level in the tank, as the measure for the tank content, but rather the torque exerted around a swinging spindle by the weight of the tank including its filling, the precision of indication is independent of the tank shape. In particular, the tank may be very flat as are many modern fuel tanks, and it may possibly also be "rugged". In particular in the latter case, it is useful with a view to a linear indication that, in a further embodiment of the invention, filling-dependent shiftings of the center of gravity caused by the irregular shape of the tank are taken into account by a linearizing circuit in which is stored, as it were, the pertinent tank shape.

The influence of the swinging motions, too, of the tank content can be easily eliminated or kept within acceptable limits by yet another embodiment of the invention wherein the measuring device assembly contains, e.g., a damping circuit obtained by means of a low-pass filter. Inasmuch as, on the one hand, when the vehicle is standing, the problem of swinging of the tank content is not present and, on the other hand, it is of interest when the driving engine is started that a clear indication of the fuel available is obtained, and additional embodiment of the invention offers the possibility of bridging the damping circuit.

A further advantage of the invention may be found in the fact that in constructing the arrangement of the present invention commercially available components may be used, in particular also for the purposes of the measuring device. In order to detect the torque exerted by the weight of the filled tank, wire resistance strain gauges may be used, possibly in a bridge circuit which is known in itself and therefore not further described. Further components for signal processing, including digital or analog indication, are likewise known in themselves.

BRIEF DESCRIPTION OF THE DRAWINGS

The single FIGURE illustrates an example of an embodiment of the invention for determination of the content of a fuel tank.

DETAILED DESCRIPTION OF THE PREFERRED EMBODIMENTS

The tank 1 which, as shown in the drawing, is relatively flat and has a complex shape horizontally, is supported fixedly on a frame 2. The frame 2 is supported in a swinging fashion at 3 by means of a swinging spindle 4 extending perpendicular to the drawing plane and thus horizontally, while the frame's right end, as shown in the drawing, is suspended by means of a tension member 5 in opposition to the force due to the effect of torque exerted around the swinging spindle 4 by the weight of the filled tank. A stay or prop may also be provided here in place of a suspension. By 6 is designated an element fixed to the vehicle.

The swinging spindle 4 may also be formed by tension bands which at the same time constitute a torque suspension.

The tension member 5 constituting the suspension carries at least one wire resistance strain gauge 7 whose output is connected electrically with an amplifier 8 in a customary manner (preferably via a bridge circuit). Between the amplifier 8 and a digital indicator 9 are provided two electric assemblies 10 and 11. The assembly 10 is an RC low pass filter for damping. Its purpose is to delay an indication of the fluctuations of the electric signal delivered by the wire resistance strain gauge which occur during rocking motions of the tank content, until the rocking motions have subsided. In order for the operator of the vehicle to receive a rapid indication of the tank content when he starts the engine, i.e., when the vehicle is still standing and rocking motions of the tank content are absent, a contact 12 of the ignition switch 12a is connected in parallel with the filter proper so that only when the ignition of the vehicle is connected, the damping filter is bridged and an indication is produced immediately in the indicator 9.

The circuit component 11 serves to linearize the electric quantity measured, i.e., to produce a proportionality between the input voltage U of the component, on the one hand, and the tank content measured in 1, on the other hand. Viewing once more the tank 1, we find in case of a first, relatively low, liquid level 13 e.g. the center of gravity S1 with a first lever arm relative to the swinging spindle 4, whereas when the tank is almost filled (level 14), the center of gravity S2 present then has a considerably larger lever arm relative to the swinging spindle 4. Accordingly, the output signal of the wire resistance strain gauge 7 is not only, as desired, a function of the prevailing fuel weight but also of the individual shape of the tank 1. The dependence of the output signal of the sensor 7 upon the individual tank shape is taken into account in the linearizing stage 11, and thereby is eliminated, as it were, so that in 9 occurs an indication, independent of the tank shape, of the fuel quantity still available in the tank 1.

The fuel tank content may be displayed on the multi-function indicators which are present in late-model automobiles. Individual electromechanical instruments have been eliminated.

Accordingly, the invention creates an arrangement for tank content measurement, employable even in case of "scurrilous" tank shapes, which in an advantageous manner requires only well-tested mechanical and electrical components.

While the invention has been illustrated and described as embodied in an arrangement for measurement in an operating-medium tank, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

I claim:

1. A system for measuring the contents of a tank containing fuel for a motor vehicle engine, said system comprising:
    means including an essentially horizontal spindle supporting said tank for pivotal movement in response to gravity about said spindle at a position such that the center of gravity at all fuel levels is disposed on the same side of said spindle; and
    electrical measuring means operatively coupled to said tank, at a point disposed on the same side thereof as its center of gravity, for producing an electrical output signal having a value proportional to the force exerted on said measuring means by pivotal movement of said tank about said spindle, as a measure of tank content, said electrical measuring means including damping circuit means for damping fluctuations in said output signal due to rocking motion of the tank contents, and a normally open contact connected in parallel with said damping circuit means adapted to be momentarily closed for bridging the damping circuit only when the ignition of the vehicle engine is connected.

2. A system as defined in claim 1, wherein said electric measuring means includes linearizing circuit means for taking into consideration a filling-dependent displacement of the center of gravity of the tank.

3. A system as defined in claim 1, and further comprising:
    a linearizing circuit means connected to receive an output signal from said damping circuit means for modifying the output signal from said damping circuit means such that it provides a linear representation of the amount of fuel in the tank regardless of the shape of the tank, and an indicator connected to said linearizing circuit means and responsive to said linear representation for displaying the amount of fuel in the tank.

4. In a motor vehicle having a supporting frame and a fuel tank mounted thereon for pivotal movement in response to gravity about an essentially horizontal axis at a position such that the center of gravity of the tank at all fuel levels is disposed on the same side of said axis, a system for measuring the contents of said fuel tank comprising:
    electrical measuring means including resistance strain gage means, operatively coupled between said frame and said tank at a point disposed on the same side thereof at which its center of gravity for all fuel levels is disposed for producing an electrical output signal having a value proportional to the force exerted on said strain gage means by pivotal movement of said tank about said horizontal axis, as a measure of tank content, damping circuit means for damping fluctuations in said output signal due to rocking motion of fuel in the tank, a normally open contact connected in parallel with said damping circuit means adapted to be momentarily closed for bridging said damping circuit when the ignition of the vehicle motor is connected, linearizing circuit means connected to receive an output signal from said damping circuit means for modifying said output signal such that it provides a linear representation of the amount of fuel in the tank regardless of the shape of the tank, and an indicator connected to said linearizing circuit means and responsive to said linear representation for displaying the amount of fuel in the tank.

* * * * *